UNITED STATES PATENT OFFICE.

PAUL HÜSSY AND WILLY FÖHRENBACH, OF BASEL, SWITZERLAND, ASSIGNORS TO SOCIETY OF CHEMICAL INDUSTRY IN BASLE, OF BASEL, SWITZERLAND.

COMPOUNDS DERIVED FROM DIALLYLBARBITURIC ACID AND ALKALOIDS OF THE MORPHIN SERIES AND A PROCESS OF MAKING SAME.

1,255,423.      Specification of Letters Patent.      Patented Feb. 5, 1918.

No Drawing.      Application filed April 9, 1917. Serial No. 160,878.

*To all whom it may concern:*

Be it known that we PAUL HÜSSY, a citizen of the Swiss Republic, and resident of Basel, Switzerland, and WILLY FÖHRENBACH, a subject of the Grand Duke of Baden, and resident of Basel, Switzerland, have invented new and useful Therapeutically-Valuable Compounds Derived from Diallylbarbituric Acid and Alkaloids of the Morphin Series and Processes of Making Same, of which the following is a full, clear, and exact specification.

We have found that therapeutically valuable compounds are obtained by acting with allylbarbituric acid on an alkaloid of the morphin series, as for instance, morphin diacetylmorphin, ethylmorphin, etc. Both of the components can be employed in a free state or in form of their salts and they are combined preferably in presence of a solvent or of a diluent. The new compounds are crystallized substances of well defined compositions and are easily soluble in hot water, alcohol, methylalcohol, acetone, acetic ether and insoluble in petroleum ether. Their therapeutical action corresponds not only to the sum of the actions of their components, but surpasses this sum by a multiple in many respects and in the same time is an entirely unexpected one relatively to those of their components. The toxicity of the new compounds is lower than that of their components. The new compounds, particularly those derived from ethylmorphin and from diacetylmorphin, produce a dream sleepiness without any disagreeable secondary action as for instance head-ache, giddiness, etc.; they can therefore be employed successfully for obstetrics or as sedatives previously to surgical operations.

The invention is illustrated by the following examples:

Example 1. 30.3 gr. of morphin are boiled for half an hour with 20.8 gr. of diallylbarbituric acid and 300 ccm. of acetone. After cooling the mass crystallizes spontaneously, the morphin - diallyl - barbituric acid separating hereby as well formed needles melting at 258° C., which dissolves easily in hot water, alcohol (ethylalcohol), methylalcohol, acetone and acetic ether. The new compound is insoluble in petroleum ether.

Example 2: 36.9 gr. of diacetylmorphin (base) are boiled for half an hour with 20.8 gr. of diallylbarbituric acid and 200 gr. of methylalcohol in a vessel provided with a reflux cooler and the resulting solution is evaporated in vacuum to dryness. The dry residue, which stiffens blistery, is recrystallized from acetic ether, whereby the formed diacetylmorphin - diallyl - barbituric acid is obtained as coarse needles. The new compound constitutes white crystals melting at 186° C., is easily soluble in alcohol, methylalcohol, acetic ether, chloroform and acetone and insoluble in petroleum ether.

Example 3: 33.1 gr. of ethylmorphin (base) are boiled for half an hour with 20.8 gr. of diallylbarbituric acid and 200 ccm. of acetone in a vessel provided with a reflux cooler. From the solution the ethylmorphin-diallylbarbituric acid crystallizes spontaneously in the form of a crystalline mass melting at 285° C. It dissolves easily nearly in all organic solvents with exception of the petroleum ether.

Example 4: 34.3 gr. of allylmorphin (base), which can be prepared by heating an alcoholic solution of morphin (base) and of sodium ethylate with allyldimethylphenyl-ammonium hydrate in an autoclave and whose sulfate melts at 171° C., are boiled for some time with 20.8 gr. of diallylbarbituric acid and 300 gr. of anhydrous methylalcohol in a vessel provided with a reflux cooler and hereafter the solution is evaporated in vacuum to dryness. The residue is recrystallized from acetone whereby the allylmorphin-diallylbarbituric acid is obtained in the form of well formed crystals easily soluble in alcohol, methylalcohol, acetone and chloroform and insoluble in petroleum ether.

Example 5: Aqueous solutions of 36.7 gr. ethylmorphin hydrochlorate and of 23 gr. of the sodium salt of diallylbarbituric acid are mixed and the resulting clear mixture is boiled for a long time. By cooling the ethylmorphin-barbituric acid crystallizes in the form of well formed crystals. The compound possesses the properties specified in Example 3.

Example 6: 37 gr. of ethylmorphin (base) are melted together with 23 gr. of diallylbarbituric acid for a short time. By grinding the glassy product of reaction with alcohol, ether or acetone it is transformed into a colorless crystalline mass of ethylmorphin-diallylbarbituric acid.

Instead of the alkaloids mentioned in the examples, the various other alkaloids of the morphin series, as for instance benzylmorphin, methylmorphin (codein), apomorphin, apomethylmorphin (apocodein) may be employed.

What we claim is:

1. The described process for the manufacture of therapeutically valuable compounds consisting in acting with diallylbarbituric acid on an alkaloid of the morphin series.

2. The described process for the manufacture of therapeutically valuable compounds, consisting in acting with diallylbarbituric acid on an alkaloid of the morphin series in presence of a solvent.

3. The described process for the manufacture of therapeutically valuable compounds, consisting in acting with diallylbarbituric acid on an alkaloid of the morphin series in presence of a diluent.

4. As new products the described therapeutically valuable compounds derived from diallylbarbituric acid and the alkaloids of the morphin series, which constitute well crystallized substances, easily soluble in hot water, alcohol, methylalcohol, acetone and acetic ether and insoluble in petroleum ether.

5. As a new article of manufacture the described therapeutically valuable compound derived from diallylbarbituric acid and ethylmorphin, which constitutes a white crystalline substance melting at 285° C. and dissolves easily in nearly all organic solvents with exception of the petroleum ether.

In witness whereof we have hereunto signed our names this 14th day of March, 1917, in the presence of two subscribing witnesses.

PAUL HÜSSY.
WILLY FÖHRENBACH.

Witnesses:
CARL O. SPAMER,
ARMAND RITTER.